United States Patent Office 3,029,275
Patented Apr. 10, 1962

3,029,275
AMINOCYCLOBUTANEMETHYL BENZILATES
Armin G. Wilson, Highland Park, and Samuel Kuna, Westfield, N.J., assignors to Bristol-Myers Company, New York, N.Y., a corporation of Delaware
No Drawing. Filed Feb. 8, 1961, Ser. No. 87,737
9 Claims. (Cl. 260—473)

This invention relates to novel cyclobutane derivatives. More specifically this invention relates to novel benzilic acid esters of aminocyclobutanols, their non-toxic acid addition salts and quaternary ammonium salts.

The novel cyclobutane derivatives of this invention can be represented by the following two generic formulas:

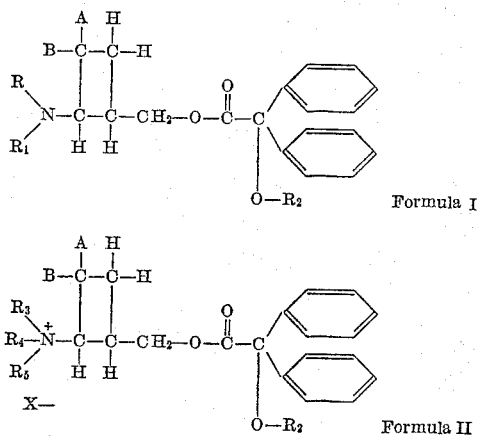

wherein for both generic Formulas I and II each of A, B, R, $R_1$, $R_3$, $R_4$ and $R_5$ is a (lower) alkyl radical; X is a halogen such as one having an atomic number of 17 to 35, i.e. chlorine or bromine, otherwise referred to as the middle halogens; and $R_2$ is either hydrogen or a (lower) alkyl radical. Illustrative of specific (lower) alkyl radicals as represented by A, B, R, $R_1$, $R_2$, $R_3$, $R_4$, and $R_5$ there can be mentioned: methyl, ethyl, propyl and isopropyl. The term (lower) alkyl or (lower) dialkyl as used in this specification and in the claims is intended to embrace alkyl radicals having from 1 to 3 carbon atoms in each alkyl chain.

Illustrative of specific novel cyclobutane derivatives of this invention as represented by generic Formula I there can be mentioned:

2-dimethylamino-3,3-dimethyl-cyclobutylmethyl benzilate;
2-dimethylamino-3,3-diethyl-cyclobutylmethyl benzilate;
2-dimethylamino-3,3-diisopropyl-cyclobutylmethyl benzilate;
2-diethylamino-3,3-dimethyl-cyclobutylmethyl benzilate;
2-methylethylamino-3,3-dimethyl-cyclobutylmethyl benzilate;
2-dipropylamino-3,3-dimethyl-cyclobutylmethyl benzilate;
2-dimethylamino-3,3-dimethyl-cyclobutylmethyl O-ethylbenzilate;
2-dimethylamino-3,3-dimethyl cyclobutylmethyl O-methylbenzilate;
2-dimethylamino-3,3-diethyl-cyclobutylmethyl O-propylbenzilate;
2-dimethylamino-3,3-diethyl-cyclobutylmethyl O-isopropylbenzilate;
2-diethylamino-3,3-dimethyl-cyclobutylmethyl O-ethylbenzilate;

and the like. Illustrative of specific novel cyclobutane derivatives of this invention as represented by generic Formula II there can be mentioned:

(2 - trimethylammonium - 3,3 - dimethyl - cyclobutylmethyl benzilate) bromide;
(2 - trimethylammonium - 3,3 - dimethyl - cyclobutylmethyl benzilate) chloride;
(2 - triethylammonium - 3,3 - dimethyl - cyclobutylmethyl benzilate) bromide;
(2 - triethylammonium - 3,3 - dimethyl - cyclobutylmethyl benzilate) chloride;
(2 - tripropylammonium - 3,3 - dimethyl - cyclobutylmethyl benzilate) bromide;
(2 - trimethylammonium - 3,3 - dimethyl - cyclobutylmethyl O-methylbenzilate) bromide;
(2 - trimethylammonium - 3,3 - dimethyl - cyclobutylmethyl O-ethylbenzilate) bromide;
(2 - triethylammonium - 3,3-dimethyl - cyclobutylmethyl O-ethylbenzilate) chloride;

and the like.

Preferred novel cyclobutane derivatives are:

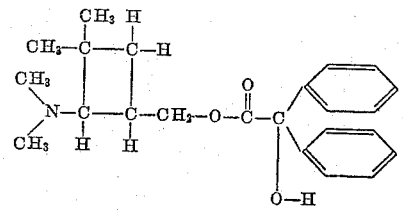

2-dimethylamino-3,3-dimethyl-cyclobutylmethyl benzilate;

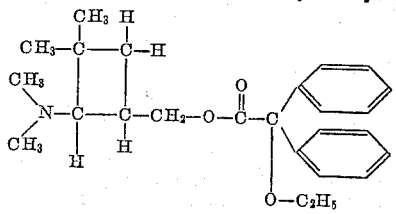

2-dimethylamino-3,3-dimethyl-cyclobutylmethyl O-ethylbenzilate;

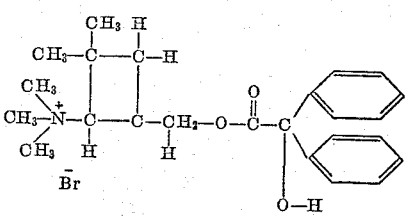

(2 - trimethylammonium - 3,3 - dimethyl - cyclobutylmethyl benzilate) bromide; and

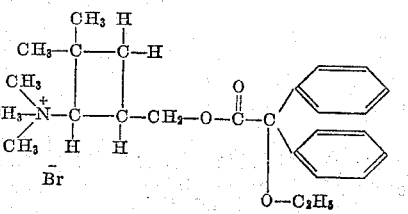

(2 - trimethylammonium - 3,3 - dimethyl - cyclobutylmethyl O-ethylbenzilate) bromide.

The novel cyclobutane derivatives of generic Formula I are produced by reacting a 2-(lower) dialkylamino-3,3-(lower) dialkyl-cyclobutylmethanol, as can be represented by the following generic Formula III with a benzilate as can be represented by the following generic Formula IV.

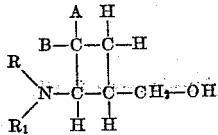
FORMULA III

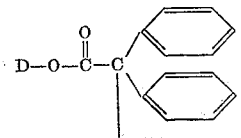
FORMULA IV

The above described reaction of a Formula III cyclobutylmethanol with a Formula IV benzilate is effected by dissolving the cyclobutylmethanol and the benzilate in an inert hydrocarbon solvent such as toluene and heating the solution in the presence of a catalytically effective quantity of a metal alcoholate such as sodium ethoxide to a temperature of about 50° C. to about 200° C. and preferably by applying sufficient heat for refluxing the solution at about atmospheric pressures. The letters A, B, R, $R_1$ and $R_2$ of generic Formulas III and IV represent the same element or radical as in generic Formula I and D of generic Formula IV represents a (lower) alkyl radical. The molar ratio of the reactants is not critical and can vary from about one to ten moles of the benzilate per mole of the cyclobutylmethanol although equimolar quantities of the two reactants can be employed. The reaction time employed is not critical and can vary from about four hours to about twenty-four hours and preferably from about six hours to about ten hours. The reaction product can be recovered by conventional techniques such as fractional distillation, extraction, extractive distillation, precipitation, or combinations of two or more of these techniques.

The cyclobutylmethanol reactant as represented by generic Formula III can be produced by reducing a corresponding cyclobutyl (lower) alkyl ester, e.g. methyl 2-dimethylamino-3,3-dimethylcyclobutane carboxylate. This reduction is preferably conducted by dissolving the cyclobutyl ester in an inert solvent such as tetrahydrofuran or diethyl ether and refluxing the solution at a temperature of about 25° C. to 150° C. in the presence of a quantity, sufficient to effectuate reduction, of a reducing agent such as a metal hydride e.g. lithium aluminum hydride. The cyclobutylmethanol can be recovered from the reaction mixture by conventional techniques such as by decomposing the reaction mixture with brine, separating and drying the ether layer, and fractionating the ether solution to recover the cyclobutylmethanol as a clear colorless liquid.

A preferred method for producing the cyclobutane ester reactant which is reduced to give the cyclobutylmethanol is by reaction of enamines such as those derived from secondary amines and aldehydes containing one alpha-hydrogen atom, with certain substituted olefins. This reaction can be illustrated by the following generic equation wherein the letters A, B, R, and $R_1$ are the same radicals as represented by the identical letters in generic Formula I and D is a (lower) alkyl radical:

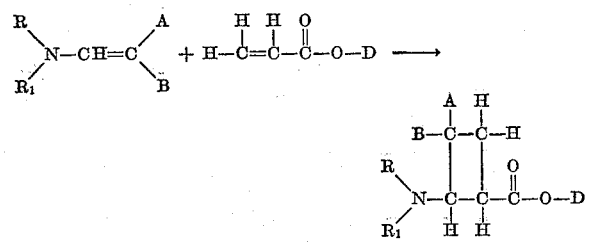

The molar proportion of the enamine reactant to the alkoxy carbonyl group containing olefin reactant can be widely varied as the cyclobutane ester derivative product can be readily separated from excess or unreacted reactants. However, substantially stoichiometric amounts of the reactants are more generally utilized in accordance with usual chemical practice. Enamines such as N,N-dimethylisobutenylamine react with equal molar proportions of such olefins as methyl acrylate to produce methyl 2-dimethylamino-3,3-dimethylcyclobutane carboxylate as represented by the following generic formula:

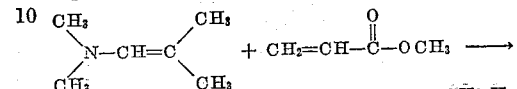

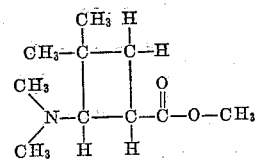

The reaction of enamines and the alkoxy carbonyl substituted olefins to prepare the cyclobutane ester derivatives proceeds readily in the absence of added catalyst materials. The reaction can be conveniently effected by merely combining the reactants at room temperature. Reaction temperatures up to the decomposition of the reactants or the reaction product can be used, although reaction temperatures in the range of about 0° C. to 200° C. are more usually used, with elevated temperatures in the range of about 50° C. to 190° C. often times utilized to facilitate the reaction. Typical reaction times vary from a few minutes to 20 hours depending mainly on the reaction temperature and the reactants employed. However, longer or shorter reaction periods can be utilized. The reaction is conveniently effected under atmospheric pressure, although higher pressures or even subatmospheric pressures can be utilized. The subject reaction can be effected in the absence of a solvent although a solvent that is substantially inert to the reactants and the reaction product can be utilized if desired.

The reaction of the described enamines and olefins containing alkoxycarbonyl groups proceeds in high yields to form the described cyclobutane esters. The cyclobutane ester product can be worked-up or purified by conventional purification methods, the preferred method varying with the properties of the product. Particularly effective purification methods include fractional distillation under reduced pressure and fractional crystallization from solvents. However, other purification methods such as solvent extraction, chromatographic adsorption and the like can also be utilized.

The novel cyclobutyl quaternary ammonium derivatives of generic Formula II can be prepared by reacting a cyclobutane derivative of generic Formula I with an appropriate quantity, e.g. one to ten moles of a (lower) alkyl halide such as methyl bromide in a polar solvent in which all components are soluble such as in a (lower) alkyl monohydric alcohol, e.g. methanol. The reaction temperature can vary from about 0° C. to about 100° C. and preferably from 25° C. to 35° C. The reaction time is preferably from about one to five days. The product, i.e. Formula II compound, is then recovered from the reaction mixture by conventional procedures such as the addition of a relatively non-polar solvent in which the final product is insoluble and subsequently filtering the mixture to recover the final product as the precipitate.

The novel cyclobutane derivatives of generic Formula I or their non-toxic acid addition salts have utility as local anesthetics, anticholinergics and as analgesics. The local anesthetic activity manifests itself by both a topical and infiltration action. The novel quaternary ammonium derivatives as represented by generic Formula II have utility as local anesthetics and anticholinergic agents.

The novel cyclobutane derivatives of this invention can be administered by the conventional methods, the conventional types of unit dosages in therapeutically effective amounts or with the conventional pharmaceutical carriers to produce the enumerated therapeutic effects in human beings and animals. Thus, they can be incorporated in pomades, jellies or solvents for use as topical local anesthetics. When employed as anticholinergics they can be administered in the same manner and quantity as other anticholinergics, e.g. homatropine methyl bromide. A preferred mode for administration when used as analgesics is orally. In addition to the novel compounds of generic Formulas I and II this specification is also intended to embrace compounds wherein R and $R_1$ of the generic formulas, together with the nitrogen atom to which they are attached, form a heterocyclic ring having one or even an additional hetero-atom, e.g. 2-(1-piperazyl)-3,3-dimethyl-cyclobutylmethyl benzilate, and 2-(1-morpholine)-3,3-dimethylcyclobutylmethyl benzilate.

The term "pharmaceutical carrier" is intended to embrace materials which are conventionally used in the administration of therapeutics in unit dosage form and include fillers, diluents, binders, lubricants, disintegrating agents and solvents. When the novel cyclobutane derivatives are employed as tablets, the conventional binding and disintegrating agents such as those used in analgesic unit dosages can be employed. Illustrative of binding agents there can be mentioned: glucose, gum acacia, gelatin and starch paste. Illustrative of disintegrating agents there can be mentioned: corn starch, keratin, and potato starch. When the novel compounds or salts of this invention are administered as analgesics in unit dosage forms by oral administration to humans the quantity of the novel therapeutic can vary from about 0.5 to about 10 grains and preferably from about 1 to about 5 grains.

The acid addition salts are produced by the conventional techniques of neutralizing the amine portion of a compound with either an organic or inorganic acid. Illustrative of the acids there can be mentioned: hydrochloric, sulfuric, citric, acetic, malic, maleic, phosphoric acids, and the like.

EXAMPLE 1

*Preparation of 2-Dimethylamino-3,3-Dimethyl-Cyclobutylmethyl Benzilate*

Ethyl benzilate (51.2 g., 0.2 mole) was dissolved in 250 mls. of toluene in a three-necked flask equipped with a fractionating column, distilling head and heating mantle. Fifteen mls. of toluene were distilled and then a solution of 0.4 g. of sodium in 5 mls. of absolute ethanol was added in three equal portions over four hours. Alcohol was collected for a total of eight hours, at which time no more alcohol appeared in the distillate. The residue, which is a bright yellow solution containing the product 2-dimethylamino-3,3-dimethyl-cyclobutylmethyl benzilate was cooled, washed with water and dried. Concentration in vacuo at 70° left 67 g. (91%) of the free base. For analysis a small portion of the 2-dimethylamino-3,3-dimethyl-cyclobutylmethyl benzilate was converted into the hydrochloride with gaseous HCl in ethyl ether. The salt appeared as a white solid on introduction of the gaseous HCl. The salt was filtered, washed with ether and dried. The melting point of the hydrochloride salt of 2-dimethylamino-3,3-dimethyl-cyclobutylmethyl benzilate was 207–208° C.

*Anal.*—Calcd. for $C_{23}H_{30}O_3NCl$; theory: C, 68.38; H, 7.49; N, 3.47. Found: C, 68.21; H, 7.78; N, 3.54.

EXAMPLE 2

*Preparation of 2-Dimethylamino-3,3-Dimethyl-Cyclobutylmethyl O-Ethylbenzilate*

Ethyl (O-ethyl) benzilate (7.7 gms. 0.0271 mole) was combined with 4.25 gms. (0.0271 mole) of 2-dimethylamino-3,3-dimethyl-cyclobutylmethanol in 75 mls. of toluene in a three-necked flask equipped with a fractionating column, distilling head and heating mantle. Ten mls. of toluene were distilled, and a solution of 0.4 g. of sodium in 5 mls. of absolute ethanol was added in 3 equal portions over four hours. Alcohol was collected for a total of eight hours, at which time no more alcohol appeared in the distillate. The yellow solution was cooled, washed with water and dried. After removal of the solvent by distillation there remained 9.8 gms. of product which on distillation gave 6 gms. (56%) of 2-dimethylamino-3,3-dimethyl-cyclobutylmethyl O-ethylbenzilate. A portion of the base was converted to the hydrochloride as in Example 1. The hydrochloride salt of 2-dimethylamino-3,3-dimethyl-cyclobutylmethyl O-ethylbenzilate had a melting point of 136.0 to 137.5° C.

*Anal.*—Calcd. for $C_{25}H_{35}O_3NCl$; theory: C, 69.34; H, 8.15; N, 3.24. Found: C, 69.63; H, 7.78; N, 3.34.

EXAMPLE 3

*Preparation of 2-Dimethylamino 3,3-Dimethyl-Cyclobutylmethanol*

A solution of 18.5 gms. of methyl 2-dimethylamino-3,3-dimethylcyclobutane carboxylate in 100 mls. of ether was added dropwise to a solution of 7.6 gms. of lithium aluminum hydride ($LiAlH_4$) in 200 mls. of ether in a three-necked flask equipped with a stirrer and reflux condenser. After the addition was complete, the mixture was refluxed for one hour. The reaction mixture was cooled and treated dropwise with 20 mls. of brine. The ether was removed on the steam bath and the residue distilled. Thirteen grams (83%) of the product, 2-dimethylamino-3,3-dimethyl-cyclobutylmethanol were obtained. The product is a colorless mobile liquid having a boiling point of 70° C. to 71° C. at 9 mm. of pressure.

*Anal.*—Calcd. for $C_9H_{19}ON$; theory: C, 68.8; H, 12.1; N, 8.92. Found: C, 68.8; H, 12.4; N, 8.92.

EXAMPLE 4

*Preparation of Methyl 2-Dimethylamino-3,3-Dimethyl-Cyclobutane Carboxylate*

A mixture of N,N-dimethylisobutenylamine (297 g. 3 mole) and methyl acrylate (258 g., 3 mole) was heated for two hours at 170° C. in an autoclave. Distillation of the reaction mixture gave, after removal of unreacted starting materials, 419 grams (75% yield) of the methyl ester of 2-dimethylamino-3,3-dimethylcyclobutanecarboxylic acid (methyl 2-dimethylamino-3,3-dimethylcyclobutane carboxylate), B.P. 49–50° at 1.5 mm., $N_D20 = 1.4448$

EXAMPLE 5

*Preparation of N,N-Dimethylisobutenylamine*

A chilled mixture of isobutyraldehyde (288 g., 4 moles), 500 ml. of xylene and 150 g. of anhydrous potassium carbonate was charged to an autoclave. Then dimethylamine (200 g., 4.4 moles) was added and the autoclave was closed and heated at 100° C. for 4 hours. The autoclave was allowed to cool, was vented cautiously and discharged. The mixture was filtered by gravity and the filtrate was distilled to give after removal of unreacted starting materials, 198 g. (50%) of N,N-dimethylisobutenylamine, B.P. 87–89° C., $N_D20=1.4219$.

EXAMPLE 6

*Preparation of (2-Trimethylammonium-3,3-Dimethyl-Cyclobutylmethyl Benzilate) Bromide*

In a 500 ml. bomb tube containing 100 ml. of a 25% methyl bromide solution in methanol there was dissolved at 0° C., 19.3 grams (0.053 mole) of 2-dimethylamino-3,3-dimethyl-cyclobutylmethyl benzilate. The container was sealed in a steel bomb and allowed to stand for five days at 0° C. The crystalline crop of (2-trimethylammonium-3,3-dimethyl-cyclobutylmethyl benzilate) bromide which formed was filtered, washed with a 50–50 mixture (by volume) of methanol and ether and then dried. The yield of product (13.8 g.) had a melting point of 198° C. to 199° C.

*Analysis.*—Calcd. for $C_{24}H_{32}O_3NBr$; Theory: C, 62.33; H, 6.98; and N, 3.03. Found: C, 61.99; H, 6.80; H, 3.45.

EXAMPLE 7

A suitable formulation of tablets for analgesic use consists of:

| | Grams |
|---|---|
| (1) Hydrochloride salt of 2-dimethylamino-3,3-dimethyl-cyclobutylmethyl O-ethylbenzilate | 25 |
| (2) Lactose | 30 |
| (3) Starch | 5 |
| (4) Magnesium stearate | 2 |

The cyclobutane derivative, lactose and starch are thoroughly mixed and granulated. For tabletting, the magnesium stearate is added, mixed with the granules and the mixture tabletted on a rotary press. Use of this procedure produces 200 tablets each containing 125 mg. of the active analgesic agent.

EXAMPLE 8

Another suitable formulation of tablets for analgesic use consists of:

| | Grams |
|---|---|
| (1) Hydrochloride salt of 2-dimethylamino-3,3-dimethyl-cyclobutylmethyl O-ethylbenzilate | 30 |
| (2) b-Lactose | 30 |
| (3) Dextrin | 10 |
| (4) Hydrogenated vegetable oil | 0.5 |
| (5) Talc | 2 |

The benzilate derivative, b-lactose and dextrin are thoroughly mixed and granulated. For tabletting, the hydrogenated vegetable oil and talc are added, mixed with the granules and the mixture tabletted on a rotary press. Use of this procedure can produce 100 tablets with each tablet containing 300 mg. of the active analgesic agent.

What is claimed is:

1. A cyclobutane derivative selected from the group consisting of a compound of the formula:

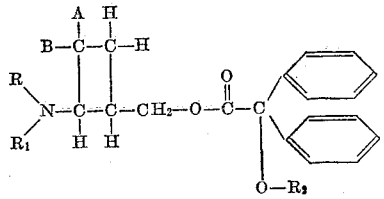

wherein each of A, B, R and $R_1$ is (lower) alkyl; $R_2$ is a member selected from the group consisting of hydrogen and (lower) alkyl; and a non-toxic acid addition salt of said cyclobutane derivative.

2. A cyclobutane derivative of the formula:

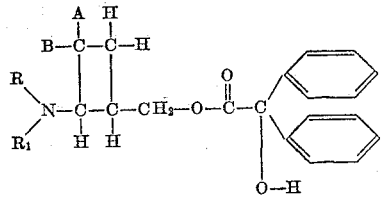

wherein each of A, B, R and $R_1$ is (lower) alkyl.

3. A cyclobutane derivative of the formula:

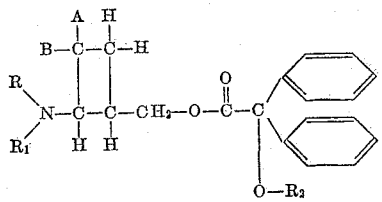

wherein each of A, B, R, $R_1$, and $R_2$ is (lower) alkyl.

4. 2-dimethylamino-3,3-dimethyl-cyclobutylmethyl benzilate.

5. 2-dimethylamino-3,3-dimethyl-cyclobutylmethyl O-ethylbenzilate.

6. A cyclobutane derivative of the formula:

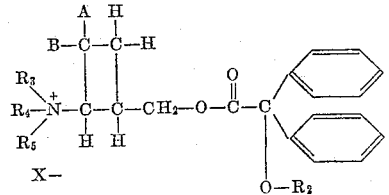

wherein each of A, B, $R_3$, $R_4$ and $R_5$ is (lower) alkyl; X is a middle halogen atom; and $R_2$ is a member selected from the group consisting of hydrogen and (lower) alkyl.

7. A cyclobutane derivative of the formula:

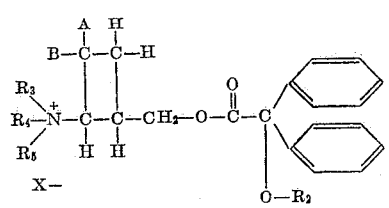

wherein each of A, B, $R_2$, $R_3$, $R_4$, and $R_5$ is (lower) alkyl and X is a middle halogen.

8. A cyclobuane derivative of the formula:

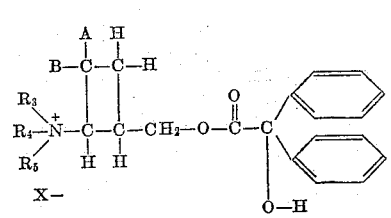

wherein each of A, B, $R_3$, $R_4$, and $R_5$ is (lower alkyl and X is a middle halogen.

9. (2-trimethylammonium - 3,3 - dimethyl-cyclobutylmethyl benzilate) bromide.

No references cited.